United States Patent [19]

Mark et al.

[11] Patent Number: 4,608,430
[45] Date of Patent: Aug. 26, 1986

[54] POLYCARBONATE EXHIBITING IMPROVED HEAT RESISTANCE FROM DIPHENOL CONTAINING DISUBSTITUTED PHENYLENE RADICAL

[75] Inventors: Victor Mark, Evansville, Ind.; John R. Campbell, Clifton Park, N.Y.

[73] Assignee: General Electric Company, Mt. Vernon, Ind.

[21] Appl. No.: 687,147

[22] Filed: Dec. 28, 1984

[51] Int. Cl.$^4$ .............................................. C08G 63/62
[52] U.S. Cl. .................................... 528/196; 528/176; 528/179; 528/182; 528/193; 528/194; 528/198; 528/199; 528/202; 528/204
[58] Field of Search ..................... 528/196, 204, 202

[56] References Cited

U.S. PATENT DOCUMENTS 4,237,259 12/1980 Keely .................................... 528/196

FOREIGN PATENT DOCUMENTS 689982 7/1964 Canada ................................ 528/196

*Primary Examiner*—Harold D. Anderson
*Attorney, Agent, or Firm*—Myron B. Kapustij; Martin B. Kapustij

[57] ABSTRACT

Polycarbonates exhibiting improved heat resistances comprised of the reaction products of (i) a carbonate precursor and (ii) at least one dihydric phenol represented by the general formula

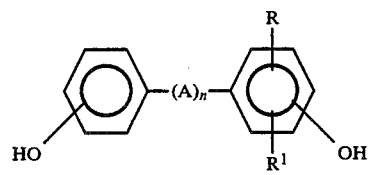

wherein:
R and $R^1$ are independently selected from alkyl radicals;
A is selected from divalent hydrocarbon radicals,

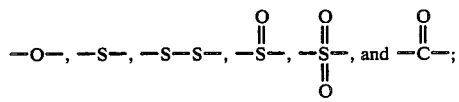

and
n is either zero or one.

7 Claims, No Drawings

POLYCARBONATE EXHIBITING IMPROVED HEAT RESISTANCE FROM DIPHENOL CONTAINING DISUBSTITUTED PHENYLENE RADICAL

BACKGROUND OF THE INVENTION

Polycarbonates are well known thermoplastic materials which, due to their many advantageous properties find use as thermoplastic engineering materials in many commercial and industrial applications. The polycarbonates exhibit, for example, excellent properties of toughness, flexibility, and impact strength.

While presently available conventional polycarbonates are quite useful in a wide range of applications there nevertheless exists a need, especially in applications involving high temperature environments, for polycarbonates exhibiting, to a substantial degree, substantially most of the advantageous properties of conventional polycarbonates and also exhibiting greater heat resistance than that possessed by conventional polycarbonates.

It is an object of the instant invention to provide polycarbonates exhibiting improved heat resistances.

SUMMARY OF THE INVENTION

The instant invention relates to polycarbonates exhibiting improved heat resistances. More specifically the instant invention relates to polycarbonates derived from (i) a carbonate precursor, and (ii) at least one unsymmetrical dialkyl substituted dihydric phenol.

DETAILED DESCRIPTION OF THE INVENTION

It has now been discovered that polycarbonates can be provided which, while substantially retaining to a substantial degree substantially most of the advantageous physical properties of conventional polycarbonates, also exhibit improved heat resistance.

These polycarbonates are derived from (i) a carbonate precursor, and (ii) at least one dihydric phenol represented by the general formula

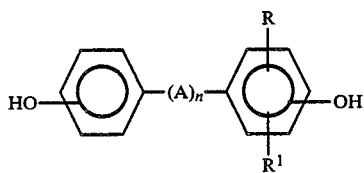

wherein:

R and $R^1$ are independently selected from alkyl radicals;

A is selected from divalent hydrocarbon radicals,

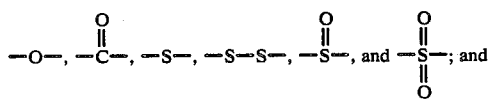

n is either zero or one; with the proviso that R and $R^1$ are ortho to the hydroxyl group.

The alkyl radicals represented by R and $R^1$ include both the straight chain alkyl radicals and the branched alkyl radicals. Preferred alkyl radicals are those containing from 1 to about 8 carbon atoms. Some illustrative non-limiting examples of these alkyl radicals include methyl, ethyl, propyl, isopropyl, butyl, tertiarybutyl, pentyl, neopentyl, and hexyl.

The divalent hydrocarbon radicals represented by A include alkylene radicals, cycloalkylene radicals, alkylidene radicals, and cycloalkylidene radicals. The preferred alkylene radicals are those containing from 2 to about 10 carbon atoms. The preferred alkylidene radicals are those containing from 1 to about 10 carbon atoms. The preferred cycloalkylene and cycloalkylidene radicals are thsoe containing from 4 to about 16 ring carbon atoms.

Preferred compounds of Formula I are the 4,4'-bisphenols, i.e., compounds of Formula I represented by the general formula

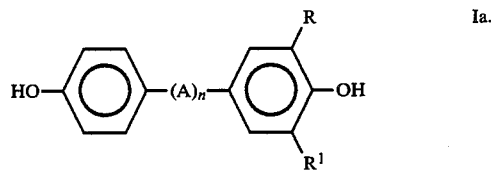

wherein R, $R^1$, A and n are as defined hereinafore.

Preferred compounds of Formulae I and Ia are those wherein n is one and A is selected from divalent hydrocarbon radicals. The preferred divalent hydrocarbon radicals are the alkylidene and cycloalkylidene radicals.

Particularly useful compounds of Formulae I and Ia are those wherein A is the isopropylidene radical.

Some illustrative non-limiting examples of the dihydric phenols falling within the scope of Formula I include:

2,6-dimethyl-4,4'-thiodiphenol;
2,6-dimethyl-4,4'-isopropylidene bisphenol;
2-methyl-6-ethyl-4,4'-isopropylidene bisphenol;
2,6-diethyl-4,4'-isopropylidene bisphenol;
2,6-ditertiarybutyl-4,4'-isopropylidene bisphenol;
2,6-dimethyl-4,4'-methylene bisphenol;
2,6-dimethyl-4,4'-ethylidene bisphenol;
2,6-dineopentyl-4,4'-(1,1-pentylidene)bisphenol;
2,6-dipropyl-4,4'-(2,2-pentylidene) bisphenol;
2,6-dipropyl-4,4'-cyclohexylidene bisphenol;
2,6-dimethyl-4,4'-cyclododecylidene bisphenol;
2,6-dimethyl-4,2'-isopropylidene bisphenol; and
2,6-dipropyl-4,4'-(1,1-butylidene)bisphenol.

Generally, polycarbonates derived from dihydric phenols in which A represents an alkylidene or cycloalkylidene radical tend to have somewhat better heat resistances than polycarbonates derived from dihydric phenols of Formula I wherein A represents an alkylene radical.

The carbonate precursors useful in the practice of the instant invention include the carbonyl halides, the bishaloformates, and the diarylcarbonates. The carbonyl halides include carbonyl chloride, carbonyl bromide, and mixtures thereof. The bishaloformates include the bishaloformates of dihydric phenols such as bisphenol-A hydroquinone, and the like. Typical of the diarylcarbonates are diphenyl carbonate and the di(alkylphenyl) carbonates such as di(tolyl) carbonate. Some other illustrative non-limiting examples of suitable diarylcarbonates include di(naphthyl) carbonate, phenyl tolyl carbonate, and the like.

The preferred carbonate precursors are the carbonyl halides with carbonyl chloride, also known as phosgene, being the preferred carbonyl halide.

The polycarbonates of the instant invention may be prepared by the known conventional processes such as, for example, interfacial polymerization, transestrification, melt polymerization, and the like. A particularly useful process for the preparation of the polycarbonates of the instant invention is the interfacial polymerization process.

The interfacial polymerization system involves the use of an aqueous caustic solution, an organic water immiscible solvent such as methylene chloride, at least one dihydric phenol of Formula I, a carbonate precursor such as phosgene, a catalyst, and a molecular weight regulator.

The catalysts which are employed can be any of the well known catalysts that facilitate the polymerization reaction between a dihydric phenol and a carbonate precursor to a carbonate polymer. These catalysts include, but are not limited to, tertiary amines such as triethyl amine, quaternary ammonium compounds, and quaternary phosphonium compounds.

The molecular weight regulators employed may be any of the known compounds that regulate the molecular weight of the carboante polymer by a chain terminating mechanism. These compounds include, but are not limited to, phenol, tertiarybutyl phenol, chroman I, and the like.

The temperature at which the reaction proceeds, when phosgene is utilized as the carbonate precursor, may vary from below 0° C. to above 100° C. The reaction proceeds satisfactorily at temperatures from room temperature (25° C.) to about 50° C. Since the reaction is exothermic the rate of phosgene addition or the use of a low boiling solvent such as methylene chloride may be used to control the reaction temperature.

The carbonate polymers of the instant invention contain the following recurring structural units:

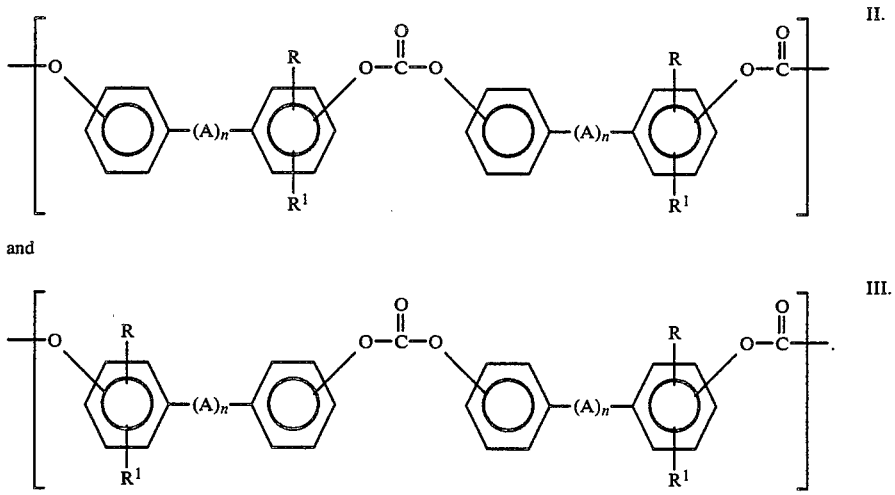

The preferred polycarbonates contain the following recurring structural units

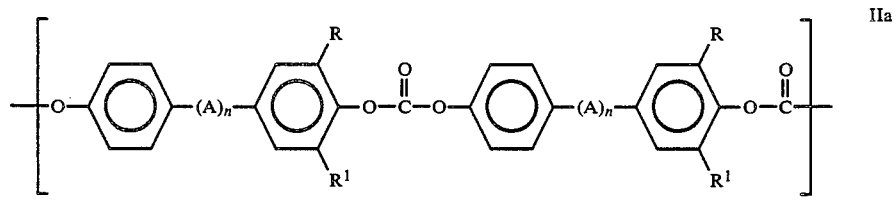

also referred to as the "head-to-tail" component

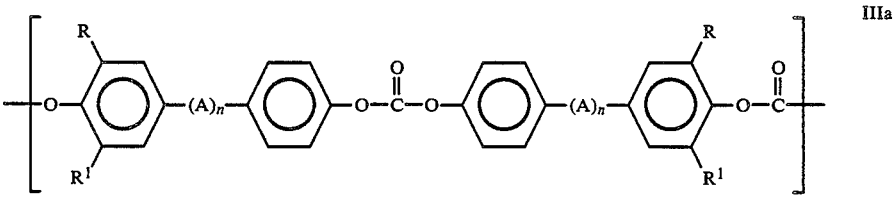

which represents the "tail-to-tail" sequence.

It was found that by varying the polymerization condition the structure of the polycarbonate can be easily modified, in that the ratio of structural units IIa and IIIa can be altered, as shown in more detail in the Examples. Variations in ratios of the structural units results in modifications in polymer properties, such as glass transition temperature and solubility characteristics.

In the preparation of the instant carbonate polymers it is, of course, possible to utilize mixtures of two or more different dihydric phenols of Formula I, as well as individual dihydric phenols of Formula I.

Another embodiment of the instant invention is a carbonate copolymer obtained by reacting (i) a carbonate precursor, (ii) at least one dihydric phenol of Formula I, and (iii) at least one dihydric phenol represented by the general formula

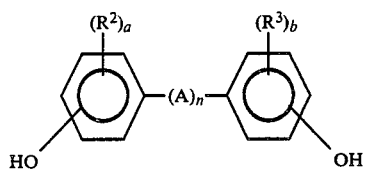

wherein $R^2$ and $R^3$ are independently selected from halogen, monovalent hydrocarbon, and monovalent hydrocarbonoxy radicals;

a and b are independently selected from whole numbers having a value of from 0 to 4 inclusive;

A and n are as defined hereinafore.

The preferred halogen radicals represented by $R^2$ and $R^3$ are chlorine and bromine.

The monovalent hydrocarbon radicals represented by the $R^2$ and $R^3$ are the alkyl radicals, the aryl radical, aralkyl radicals, the alkaryl radicals, and the cycloalkyl radicals. The preferred alkyl radicals represented by $R^2$ and $R^3$ are those containing from 1 to about 8 carbon atoms. Some illustrative non-limiting examples of these alkyl radicals include methyl, ethyl, propyl, isopropyl, butyl, isobutyl, tertiary butyl, pentyl, neopentyl, and the like. The preferred aryl radicals represented by $R^2$ and $R^3$ are those containing from 6 to 12 carbon atoms, i.e., phenyl, naphthyl, and biphenyl. The preferred aralkyl and alkaryl radicals represented by $R^2$ and $R^3$ are those containing from 7 to about 14 carbon atoms. Some illustrative non-limiting examples of these aralkyl and alkaryl radicals include benzyl, tolyl, ethylhenyl, and the like. The preferred cycloalkyl radicals represented by $R^2$ and $R^3$ are those containing from 4 to about 6 ring carbon atoms and include cyclobutyl, cyclopentyl, cyclohexyl, methycyclohexyl, and the like.

The monovalent hydrocarbonoxy radicals represented by $R^2$ and $R^3$ are preferably selected from alkoxy radicals and aryloxy radicals. The preferred alkoxy radicals represented by $R^2$ and $R^3$ are those containing from 1 to about 8 carbon atoms. Some illustrative non-limiting examples of these alkoxy radicals include methoxy, butoxy, isopropoxy, propoxy, and the like. The preferred aryloxy radical is phenoxy.

Preferably $R^2$ and $R^3$ are independently selected from monovalent hydrocarbon radicals, with the alkyl radicals being the preferred monovalent hydrocarbon radicals.

The preferred alkylene radicals represented by A are those containing from 2 to about 6 carbon atoms. Some illustrative non-limiting examples of these alkylene radicals include ethylene, propylene, butylene, and the like. The preferred alkylidene radicals represented by A are those containing from 1 to about 6 carbon atoms. Some illustrative non-limiting examples of these alkylidene radicals include ethylidene, 1,1-propylidene, 2,2-propylidene, and the like.

The preferred dihydric phenols of Formula IV are those wherein n is one and A is selected from alkylene or alkylidene radicals.

In the dihydric phenols of Formula IV when more than one $R^2$ or $R^3$ substituent is present on the aromatic nuclear residue they may be the same or different.

The more preferred dihydric phenols of Formula IV are the 4,4'-bisphenols.

The dihydric phenols of Formula IV are well known in the art and are generally commercially available or may be readily prepared by known methods. These phenols are generally used in the preparation of conventional prior art polycarbonates.

Some non-limiting illustrative examples of the dihydric phenols of Formula IV include:
2,2-bis(4-hydroxyphenyl)propane (bisphenol-A);
1,1-bis(3-methy-4-hydroxyphenyl)ethane;
2,2-bis(3,5-dimethyl-4-hydroxyphenyl)propane;
2,2-bis(3,5-dibromo-4-hydroxyphenyl)propane;
bis (4-hydroxyphenyl)sulfide;
1,1-bis(4-hydroxyphenyl)cyclohexane;
3,3-bis(3-methyl-4-hydroxyphenyl)pentane;
3,3'-diethyl-4,4'-dihydroxydiphenyl; and the like.

The amount of dihydric phenol of Formula I utilized in this embodiment may generally be from about 1 to about 99 weight percent, preferably from about 5 to about 90 weight percent, and more preferably from about 10 to about 80 weight percent, based on the total amounts of dihydric phenols I and IV employed.

The preferred dihydric phenol of Formula IV is bisphenol-A.

The carbonate copolymers obtained by reacting (i) a carbonate precursor, (ii) at least one dihydric phenol of Formula I, and (iii) at least one dihydric phenol of Formula IV will contain at least the following repeating structural units — those of schematic formulae II, III and

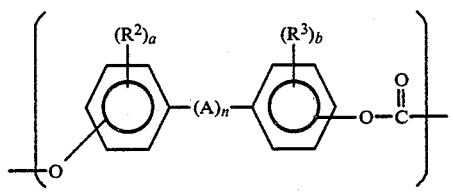

wherein A, $R^2$, $R^3$, n, b and a are as defined hereinafore.

In the practice of the instant invention only one dihydric phenol of Formula IV may be employed or a mixture of two or more different dihydric phenols of Formula IV may be utilized.

The procedures for preparing the copolymers of this embodiment are generally similar to those used for producing the polycarbonates of the instant invention as described hereinafore. The instant carbonate copolymers may optionally have admixed therewith the various additives described hereinafore.

Also included herein are the randomly branched thermoplastic polycarbonates. These randomly branched polycarbonates are prepared by utilizing a minor amount, typically between 0.05 and 2.0 mole percent, based on the amount of dihydric phenol utilized, of a polyfunctional aromatic compound which acts as a branching agent. These polyfunctional aromatic compounds contain at least three functional groups which may be hydroxyl, carboxylic anhydride, haloformyl, carboxyl, and mixtures thereof. Some illustrative non-limiting examples of these poly-functional compounds include trimellitic anhydride, trimellitic acid, trimellityl trichloride, 4-chloroformyl phthalic anhydride, pyromellitic acid, pyromellitic anhydride, pyromellitic dianhydride, mellitic acid, mellitic anhydride, trimesic acid, and the like. Other organic polyfunctional compounds useful in making branched polycarbonates are disclosed in U.S. Pat. Nos. 3,635,895 and 4,001,184, both of which are incorporated herein by reference.

The polycarbonates of the instant invention have a number average molecular weight of from about 10,000 to about 200,000, and preferably from about 20,000 to about 100,000.

The polycarbonates of the instant invention may have admixed therein the commonly known and used additives such as antioxidants; mold release agents; antistatic agents; impact modifiers; inert fillers such as glass, talc, mica, and the like; ultraviolet radiation absorbers such as the benzophenones, benzotriazoles, benzylidene malonates, and cyanoacrylates; hydrolytic stabilizers such as the epoxides; color stabilizers such as the organophosphites; colorants; and flame retaradnts.

Also included in the scope of the invention are the copolyester-carbonates. Briefly stated copolyester-carbonates resins comprise recurring carbonate groups, carboxylate groups, and aromatic carbocyclic groups in the linear polymer chain in which at least some of the carbonate groups and some of the carboxylate groups are bonded directly to the ting carbon atoms of the aromatic carbocyclic groups. These copolyester-carbonate resins contain ester bonds and carbonate bonds in the polymer chain, wherein the amount of the ester bonds is from about 25 to about 90 mole percent, preferably from about 35 to about 80 mole percent, relative to the carbonate bonds. For example, 5 moles of bisphenol-A reacting completely with 4 moles of isophthaloyl dichloride and one mole of phosgene would give a copolyester-carbonate of 80 mole percent ester bonds.

The copolyester-carbonate resins of the instant invention are derived from (i) a carbonate precursor, (ii) at least one dihydric phenol of Formula I, and (iii) at least one ester precursor. The carbonate precursor and the dihydric phenol, which are reacted with the ester precursor to form the copolyester-carbonate, are of the type described hereinafore. The ester precursor is a carboxylic acid or an ester forming reactive derivative thereof.

In general, any carboxylic acid or any reactive ester forming reactive derivative thereof conventionally used in the preparation of linear polyesters may be utilized in the preparation of the copolyester-carbonates of the instant invention. Generally, the difunctional carboxylic acids which may be used include the aliphatic carboxylic acids, aliphatic-aromatic carboxylic acids, and aromatic carboxylic acids. These acids are described in U.S. Pat. No. 3,169,121, which is hereby incorporated herein by reference.

The preferred difunctional carboxylic acids are the difunctional aromatic carboxylic acids. The preferred aromatic acids may be represented by the general formula

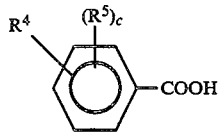

V.

wherein:
$R^4$ is a hydroxyl or a carboxyl group;
$R^5$ is independently selected from halogen and monovalent hydrocarbon radicals; and
c is a whole number having a value of from 0 to 4 inclusive.

Particularly useful difunctional carboxylic acids of Formula V are isophthalic acid, terephthalic acid, and mixtures thereof.

The ester forming reactive derivatives of the difunctional carboxylic acids include the derivatives of aliphatic carboxylic acids, aromatic carboxylic acids, and aliphatic-aromatic carboxylic acids. The preferred ester forming reactive derivatives of the difunctional carboxylic acids are the ester forming reactive derivatives of the difunctional aromatic carboxylic acids. Particularly useful derivatives of aromatic carboxylic acids are the aromatic acid dihalides.

Instead of using the difunctional acids it is preferred to utilize their ester forming reactive derivatives. Particularly useful ester forming reactive derivatives are isophthaloyl dichloride, terephthaloyl dichloride, and mixtures thereof.

The copolyester-carbonates of the instant invention may be prepared by well known conventional processes. These processes include transesterification, melt polymerization, and interfacial polymerization. Various of these conventional polymerization porcesses are disclosed in U.S. Pat. Nos. 3,030,331, 3,169,121, 3,207,814, and 4,188,314, all of which are hereby incorporated herein by reference.

A useful process for the preparation of the instant copolyester-carbonates is the interfacial polymerization process. In the interfacial polymerization process the carbonate precursor, at least one ester precursor, and at least one dihydric phenol of Formula I are reacted in the presence of an aqueous caustic solution, a water immiscible solvent, a catalyst, and a molecular weight regulator to form the copolyester-carbonate.

In the formation of the copolyester-carbonates it is, of course, possible to utilize a mixture of two or more different dihydric phenols of Formula I as well as individual dihydric phenols of Formula I. It is likewise possible to employ a mixture of two or more different ester precursors as well as individual ester precursors.

Also included within the scope of the invention are the thermoplastic randomly branched copolyester-carbonates obtained by using a branching agent of the type described hereinafore, i.e., a polyfunctional aromatic compound.

The copolyester-carbonates of the instant invention may also optionally have admixed therewith the commonly known and used additives of the type described hereinafore.

The instant copolyester-carbonate resins have a number average molecular weight in the range of from about 10,000 to about 200,000, preferably from about 20,000 to about 100,000.

These copolyester-carbonates exhibit improved heat resistances relative to the conventional copolyester-carbonates such as those derived from bisphenol-A

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis unless otherwise indicated.

The following examples illustrate polycarbonates falling outside the scope of the instant invention and are presented for comparative purposes only.

EXAMPLE 1

This example illustrates the preparation of a bisphenol-A polycarbonate.

Into a mixture of 2283 grams of pure 4,4'-isopropylidenebisphenol (bisphenol-A) (mp 156°–157° C; 10.0 mole grams), 5700 grams water, 9275 grams methylene chloride, 32 grams phenol, and 10.0 grams of triethylamine were introduced, at ambient temperature, 1180 grams phosgene over a period of 97 minutes while maintaining the pH of the two phase system at about 11, i.e., pH 10–12.5, by simultaneously adding a 25% aqueous sodium hydroxide solution. At the end of the addition period, the pH of the aqueous phase was 11.7 and the bisphenol-A content of this phase was less than 1 part per million (ppm) as determined by ultraviolet analysis.

The methylene chloride phase was separated from the aqueous phase, washed with an excess of dilute (0.01N) aqueous HCl and then washed three times with deionized water. The polymer was precipitated by steam and dried at 95° C. The resultant, pure bisphenol-A polycarbonate, which had an intrinsic viscosity (IV) in methylene chloride at 25° C. of 0.572 dl/gm., was fed to an extruder, which extruder was operated at about 550° F., and the extrudate was comminuted into pellets.

The pellets were then injection molded at about 600° F. into test bars of about $5'' \times \frac{1}{2}'' \times 1/16''$ thick. The DTUL of the test bars was determined to be 128° C. The Tg of this polycarbonate was 149° C.

The second order glass transition temperature is determined using a Perkins-Elmer DSC-2B instrument which measures the second order glass transition temperature (Tg) by differential scanning calorimetry. The Tg is an indication of the heat resistance of the polymer. Generally, the higher the Tg the more heat resistant is the polymer.

EXAMPLE 2

This example illustrates the preparation of a polycarbonate from 2,6-dimethyl-BPA falling within the scope of the present invention.

A 250 ml Morton flask equipped with condenser plus nitrogen tee, stirrer, phosgene inlet, dropping funnel and pH probe was charged with 4.10 g (16.0 mmol) of 2,6-dimethylbisphenol-A, 35.0 ml of methylene chloride, 44.0 ml of deionized water and 1.61 ml of a 10% w/w solution of triethylamine in methylene chloride. The pH of the reaction was adjusted to 13.0 by adding 2.1 ml of 50% (w/w) aqueous sodium hydroxide solution while maintaining the reaction under a nitrogen atmosphere. Phosgene was passed into the vigorously stirred reaction mixture at a rate of 0.15 g/minute while maintaining the pH of the reaction at 13.0 by adding 50% (w/w) aqueous sodium hydroxide solution. After 19 minutes (14.8 ml 50% sodium hydroxide solution added) the viscosity of the mixture had increased to the point where stirring was difficult and the phosgene addition was stopped. The organic layer was separated, and washed successively with 5% (w/w) hydrochloric acid and deionized water. The organic phase was precipitated into 500 ml methanol and precipitate was collected to give 4.2 g (93% yield of polymer. Intrinsic viscosity of the polymer as measured in chloroform solution at 25° C. was 0.87 dl/g.

The proportion of head-to-head and head-to-tail units (Table 1, Example 2) was determined from an integrated 50 MHz pmr spectrum of the polymer in deuteriochloroform solution containing 0.3–0.5 equivalents of tris (2,2-dimethyl-6,6,7,7,8,8,8-heptafluoro-3,5-octanedionato)europium (III).

EXAMPLE 3

This example illustrates the preparation of a polycarbonate of the present invention.

The apparatus of Example 2 was charged with 4.10 g (16.0 mmol) of 2,6-dimethyl-bisphenol-A, 35.0 ml of methylene chloride, 44.0 ml of deionized water and 0.16 ml (1.0 mol percent based on bisphenol) of a 10% w/w solution of triethylamine in methylene chloride. The pH of the reaction was adjusted to 11.0 by adding 0.4 ml of 50% w/w aqueous sodium hydroxide solution while maintaining the reaction under a nitrogen atmosphere. Phosgene was passed into the vigorously stirred reaction mixture at a rate of 0.15 g/minute for 5.7 minutes while maintaining the pH of the reaction at 11.0 by dropwise addition of 50% (w/w) aqueous sodium hydroxide solution. After reaction of 5.7 minutes additional triethylamine (1.45 ml of a 10% w/w/ solution in methylene chloride) was added followed by 0.7 ml of 50% aqueous sodium hydroxide solution to bring the reaction mixture pH to 13.0. Phosgenation was continued for an additional 20 minutes at a flow rate of 0.15 g/minute. The polymer was isolated as described in Example 1 to give 4.0 g of material having an intrinsic viscosity of 0.84 dl/g as measured in chloroform solution at 25.0° C. Monomer distribution in the polymer (Table 1, Example 3) was determined as described in Example 1.

TABLE 1

| POLYCARBONATES OF DIMETHYLBISPHENOL-A | | | | |
|---|---|---|---|---|
| | PHOSGENATION CONDITIONS | | | POLYMER COMPOSITIONS |
| EXAMPLE | pH | AMINE LEVEL (MOL %) | Tg (°C.) | HEAD-TO-HEAD | HEAD-TO-TAIL |
| 2 | 13 | 10 | 173–174 | 45 | 55 |
| 3 | 11–13* | 1–10* | 175–176 | 85 | 15 |

*Reaction performed at the lower level for 5.7 minutes at a phosgene flow of 0.15 g/minute (0.54 mole equivalent) then more base and amine added to bring reaction mixture to the higher values and phosgenation continued.

The following example illustrates the preparation of a polycarbonate from symmetrical dimethyl-BPA, falling outside the scope of the present invention.

EXAMPLE 4

This example illustrates the preparation of a polycarbonate from the symmetrical 2,2'-dimethyl-BPA

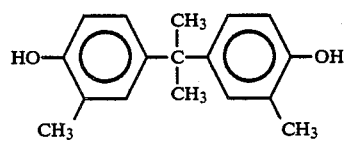

and it is outside of the scope of the present invention The procedure of Example 1 was repeated by adding access phosgene to a reaction mixture consisting of 12.8 g (0.05 mole) of 2,2'-dimethylbisphenol-A, 100 ml of methylene chloride, 80 ml of water, 0.15 g (2 mole%) of p-tert.-butylphenol and 0.2 g (4 mole%) of triethylamine while maintaining the pH at about 11 by the addition of a 15% aqueous sodium hydroxide solution. The layers were separated and the methylene chloride phase was washed with 0.01 N HCl, followed by two washings with water. The polymer was precipitated by adding the neutral methylene chloride solution to 600 ml of methanol. The filtered and dried (at 60° C.) polymer had an intrinsic viscosity of 0.46 and a glass transistion temperature of 94° C.

The following example illustrates a conventional copolyestercarbonate resin falling outside the scope of the instant invention. This example is presented for comparative purpose only.

EXAMPLE 5

To a reactor vessel were added 400 milliliters of methylene chloride, 300 milliliters of water, 34.2 grams of bisphenol-A, 0.35 gram of phenol, and 0.42 milliliter of triethylamine. At a pH of about 11, 7.6 grams of isophthaloyl dichloride dissolved in methylene chloride, 10 milliliters, were added over a 15 minute period, while maintaining the pH at about 11 by the addition of 35% aqueous caustic. After the addition of the isophthaloyl dichloride was terminated 6 grams of phosgene were introduced over a 15 minute period, while controlling the pH at about 11 by the addition of 35% aqueous caustic solution. The polymer mixture was diluted with methylene chloride and the brine phase was separated. The resulting polymer containing phase was washed with HCl and then with water, and the polymer was then recovered by methanol precipitation. The resultant copolyestercarbonate was found to have an intrinsic viscosity of 0.530 dl/gm and a Tg of 162.2° C.

EXAMPLE 6

This example illustrates the preparation of a copolyestercarbonate from the unsymmetrical 2,6-dimethylbisphenol-A and isophthaloyl dichloride, a polymer of the present invention.

A solution of 4.06 g (0.02 mole) of isophthalolyl dichloride in 30 ml of methylene chloride was added dropwise to a reaction mixture consisting of 200 ml of methylene chloride, 150 ml water, 20.5 g (0.08 mole) of 2,6-dimethylbisphenol-A, 0.18 g (2 mole%) of phenol and 0.41 g (4 mole%) of triethylamine. A 20% aqueous sodium hydroxide solution was added concomitantly to bring to and maintain the pH of the reaction mixture at about 11.0. After the addition of the dichloride was completed in about 12 minutes, phosgene was introduced at a rate of 0.5 g/minute for 13 minutes, while maintaining the pH at 11 via the addition of more sodium hydroxide. Precipitation of the polyestercarbonate from the washed organic layer by methanol and drying at 60° C. yield a polymer with a glass transition temperature of 189° C.

What is claimed is:

1. Thermoplastic polycarbonate resin exhibiting improved heat resistance comprised of the reaction product of:
   (i) a carbonate precursor; and
   (ii) at least one dihydric phenol represented by the general formula

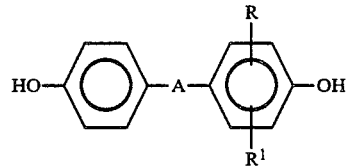

wherein:

R and $R^1$ are independently selected from alkyl radicals; and

A is selected from divalent hydrocarbon radicals.

2. The resin of claim 1 wherein said alkyl radicals contain from 1 to about 8 carbon atoms.

3. The resin of claim 1 wherein said divalent hydrocarbon radicals are selected from alkylene, cycloalkylene, alkylidene, or cycloalkylidene radicals.

4. The resin of claim 3 wherein said divalent hydrocarbon radicals are selected from alkylidene or cycloalkylidene radicals.

5. The resin of claim 4 wherein A is an alkylidene radical.

6. The resin of claim 5 wherein said alkylidene radical is the isoproplidene radical.

7. The resin of claim 6 wherein R and $R^1$ are both methyl radicals.

* * * * *

UNITED STATES PATENT AND TRADEMARK OFFICE
CERTIFICATE OF CORRECTION

PATENT NO. : 4,608,430
DATED : August 26, 1986
INVENTOR(S) : Victor Mark and John R. Campbell It is certified that error appears in the above-identified patent and that said Letters Patent are hereby corrected as shown below:

IN THE CLAIMS

Claim 6 - the word "isoproplidene" should be "isopropylidene"

Signed and Sealed this

Sixteenth Day of February, 1988

Attest:

DONALD J. QUIGG

Attesting Officer

Commissioner of Patents and Trademarks